(12) United States Patent
Ahmed et al.

(10) Patent No.: US 9,086,014 B2
(45) Date of Patent: Jul. 21, 2015

(54) OIL TANK MOUNT WITH LOCK

(71) Applicant: UNITED TECHNOLOGIES CORPORATION, Hartford, CT (US)

(72) Inventors: Sohail Ahmed, Carmel, IN (US); Nicholas Leonard, New York, NY (US); Christopher Waitkus, Henderson, NV (US)

(73) Assignee: United Technologies Corporation, Hartford, CT (US)

(*) Notice: Subject to any disclaimer, the term of this patent is extended or adjusted under 35 U.S.C. 154(b) by 0 days.

(21) Appl. No.: 14/207,809

(22) Filed: Mar. 13, 2014

(65) Prior Publication Data

US 2014/0284336 A1 Sep. 25, 2014

Related U.S. Application Data

(60) Provisional application No. 61/803,865, filed on Mar. 21, 2013.

(51) Int. Cl.
*F02C 7/06* (2006.01)
*B65D 25/22* (2006.01)
*F16M 13/02* (2006.01)

(52) U.S. Cl.
CPC . *F02C 7/06* (2013.01); *B65D 25/22* (2013.01); *F16M 13/022* (2013.01)

(58) Field of Classification Search
CPC ...... B65D 25/22; B65D 25/20; F16M 13/022; F16M 13/02; B64D 27/26
USPC ........... 220/478, 476, 480; 123/27 A; 60/796; 248/213.2, 205.1, 309.2; 244/54
See application file for complete search history.

(56) References Cited

U.S. PATENT DOCUMENTS

| | | | |
|---|---|---|---|
| 5,076,703 A | 12/1991 | Loefke et al. | |
| 6,186,550 B1 | 2/2001 | Horii et al. | |
| 6,267,147 B1 | 7/2001 | Rago | |
| 6,763,814 B2 | 7/2004 | Gokan | |
| 7,004,232 B1 | 2/2006 | Nishijima | |
| 7,225,912 B1 | 6/2007 | Toennisson et al. | |
| 7,930,953 B2 | 4/2011 | Frost | |
| 7,966,965 B2 | 6/2011 | Pisseloup | |
| 8,256,458 B2 | 9/2012 | Angst | |
| 2013/0134257 A1* | 5/2013 | Barber et al. | 244/54 |

* cited by examiner

*Primary Examiner* — Robert J Hicks
(74) *Attorney, Agent, or Firm* — Carlson, Gaskey & Olds, PC

(57) ABSTRACT

An engine has an oil tank mounted to an engine wall with clevis ears formed on both the oil tank and a mount bracket secured to the engine wall. A link connects the mount bracket clevis ears to the oil tank clevis ears. The link has a pair of spherical bearings providing a connection allowing movement between the link, the oil tank clevis ears, and the link and the mount bracket clevis ears. The link is provided with a stop such that movement of the oil tank relative to the mount bracket in one direction is stopped when the stop is engaged.

6 Claims, 5 Drawing Sheets

OIL TANK MOUNT WITH LOCK

CROSS-REFERENCE TO RELATED APPLICATION

This application claims priority to U.S. Provisional Application No. 61/803,865, filed Mar. 21, 2013.

STATEMENT REGARDING FEDERALLY SPONSORED RESEARCH OR DEVELOPMENT

This invention was made with government support under Contract No. N00019-02-C-3003, awarded by the United States Navy. The Government has certain rights in this invention.

BACKGROUND

This application relates to a mount between an oil tank and an engine wall for a gas turbine engine, wherein relative movement is allowed between the tank and the housing.

Gas turbine engines are known, and typically include a fan delivering air into a compressor. The air is compressed and delivered into a combustion section where it is mixed with fuel and ignited. Products of this combustion pass downstream over turbine rotors, driving them to rotate.

Any number of accessories are associated with a gas turbine engine. One accessory would be a starter and generator. A starter begins rotation of a shaft within the gas turbine engine at start-up. A generator is driven by rotation of the gas turbine engine, and serves to generate electricity, such as may be utilized on an associated aircraft.

The accessories require lubrication. One lubrication system includes a lubricant pump and a lubricant tank for delivering oil to the engine starter and generator. In one known mount arrangement, the oil tank is mounted to an outer engine wall. Since the tank and the outer engine wall will see different stresses and have different thermal expansion coefficients, the tank is not fixed on the outer housing. Rather, a mount has been utilized that allows relative movement.

One such mount utilizes a spherical bearing connecting a first mount lever to a link, and the link is mounted within a bracket on the tank, also through a spherical bearing. Thus, there is a link having a spherical mount between a mount bracket and a bracket on the tank. This allows freedom of movement in every direction.

This arrangement has sometimes resulted in undesirable wear.

SUMMARY

In a featured embodiment, an engine has an oil tank mounted to an engine wall with clevis ears formed on both the oil tank and a mount bracket secured to the engine wall. A link connects the mount bracket clevis ears to the oil tank clevis ears. The link has a pair of spherical bearings providing a connection allowing movement between the link and oil tank clevis ears, and the link and mount bracket clevis ears. The link is provided with a stop such that movement of the oil tank relative to the mount bracket in one direction is stopped when the stop is engaged.

In another embodiment according to the previous embodiment, the stop includes a pin extending between the mount bracket clevis ears. An arm extends away from a body of the link, and includes a slot which abuts the pin when undesired movement has occurred.

In another embodiment according to any of the previous embodiments, the stop also includes the arm which is provided with a ramp cam extending from at least one surface of the arm. The ramp cam cams into an inner surface on at least one of the mount bracket clevis ears to stop further movement.

In another embodiment according to any of the previous embodiments, the ramp cam is formed on both of opposed sides of the arm, and abuts an inner surface on both of the mount bracket clevis ears at a stop position.

In another embodiment according to any of the previous embodiments, the stop includes the arm which is provided with a ramp cam extending from at least one surface of the arm. The ramp cam cams into an inner surface on at least one of the mount bracket clevis ears to stop further movement.

In another embodiment according to any of the previous embodiments, the ramp cam is formed on both of opposed sides of the arm, and abut an inner surface on both of the mount bracket clevis ears.

These and other features may be best understood from the following specification and drawings, the following which is a brief description.

DETAILED DESCRIPTION

Figure 1:
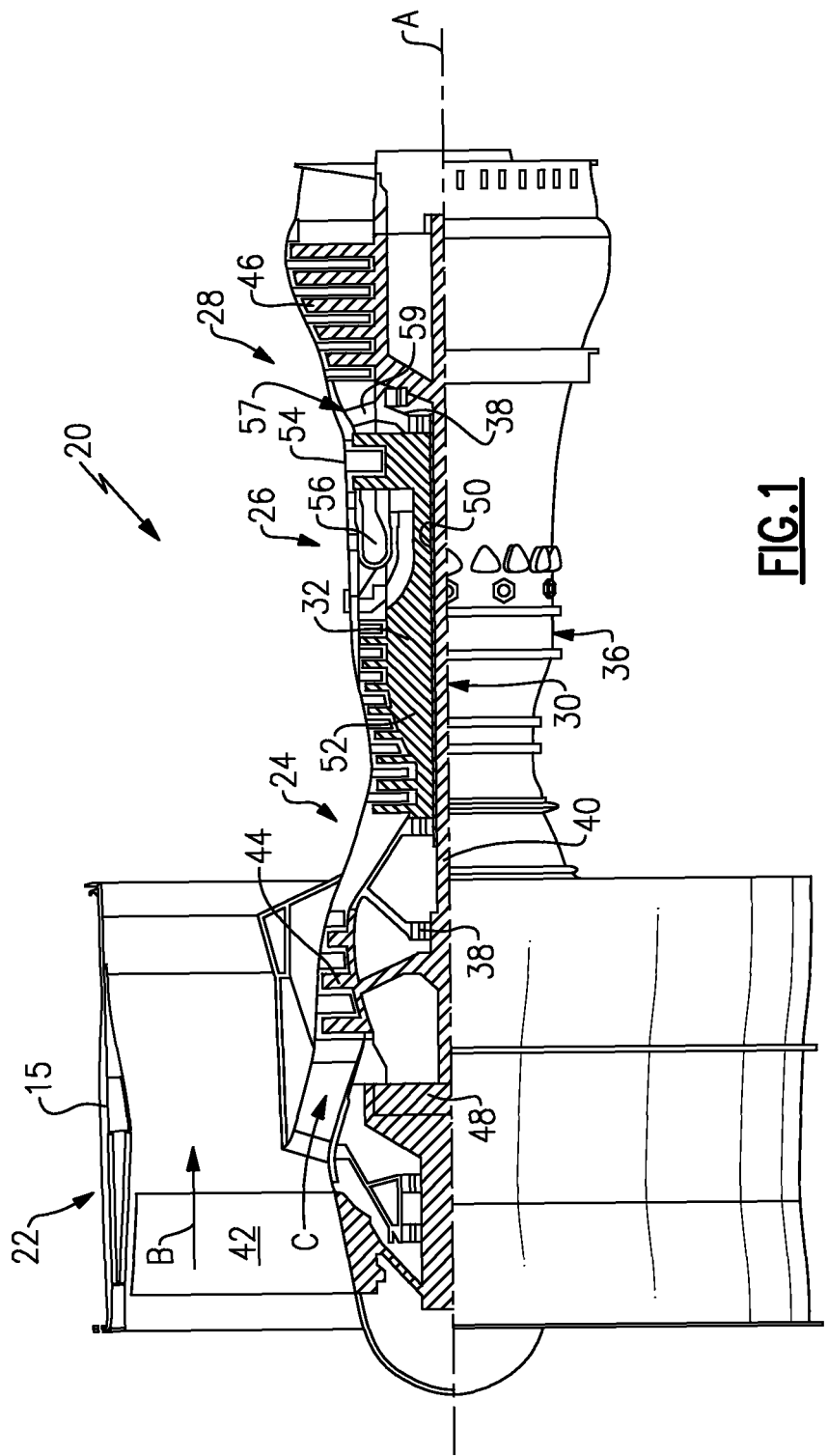
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20, in one example, is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

Figure 2A:
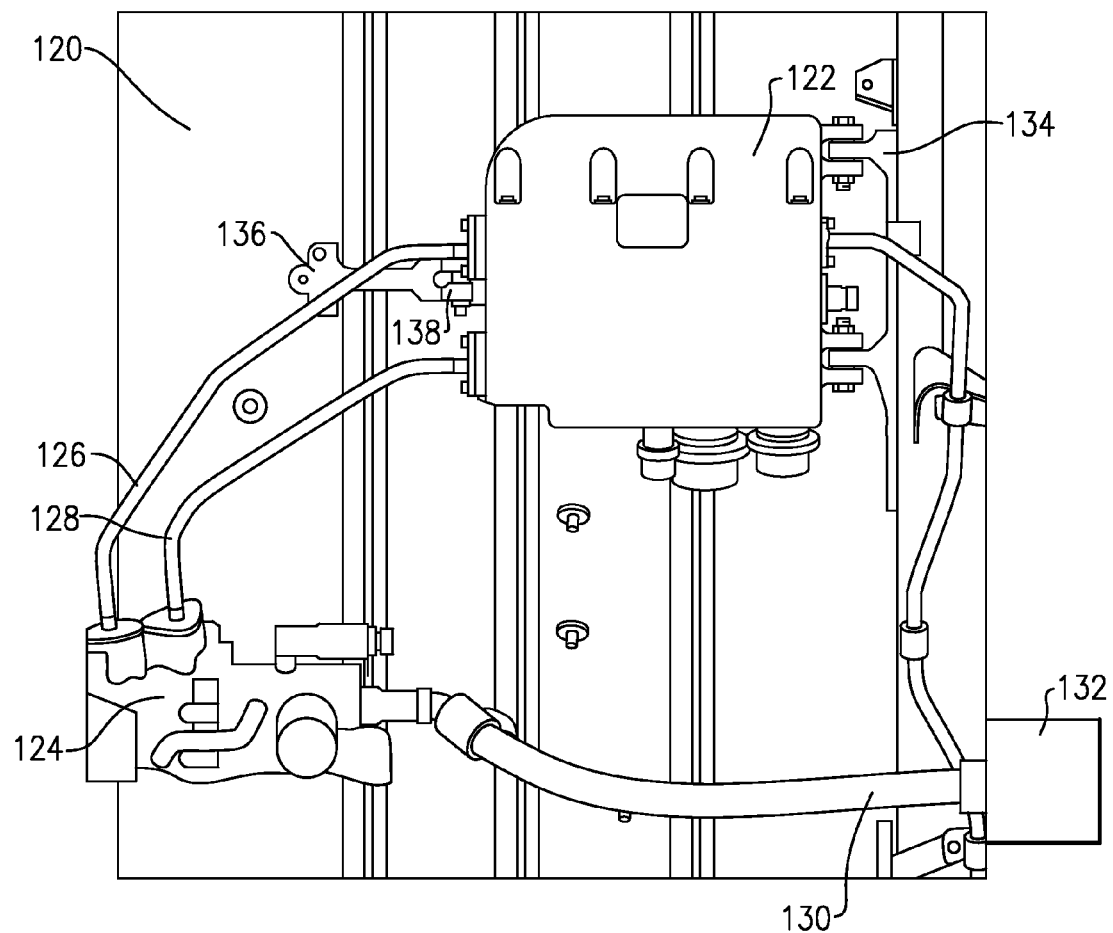
FIG. 2A shows a lubricant system.

FIG. 2A shows an engine wall 120 mounting an oil tank 122. Engine wall 120 may be part of the engine of FIG. 1. The oil tank 122 has a rear mount bracket 136, and a forward mount bracket 134. The rear mount bracket 136 is connected by oil tank clevis ears 138 to the oil tank 122 in a manner to be described below. A lubricant pump 124 receives oil from a supply line 126, and can return lubricant to the oil tank 122 through a return line 128.

In one embodiment, an outlet line 130 from the lubricant pump 124 leads to a system 132 that will use the oil. The system 132 may be an engine starter generator for a gas turbine engine, such as the gas turbine engine illustrated in FIG. 1.

Figure 2B:
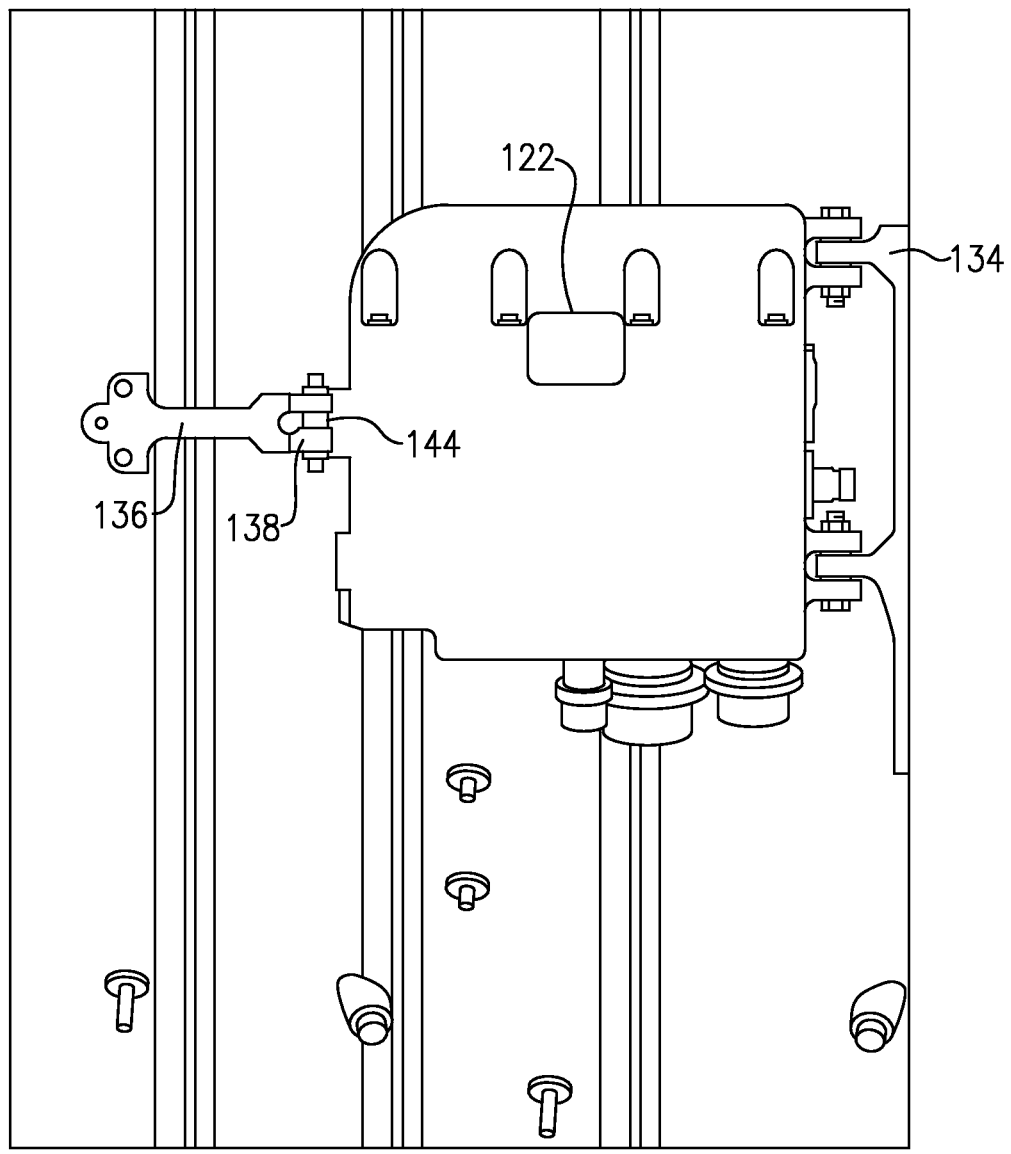
FIG. 2B shows the mounting of a tank in the lubricant system.

FIG. 2B shows details of the mount bracket 134/136 for the oil tank 122. A link 144 connects rear mount bracket 136 to oil tank clevis ears 138.

Figure 3:
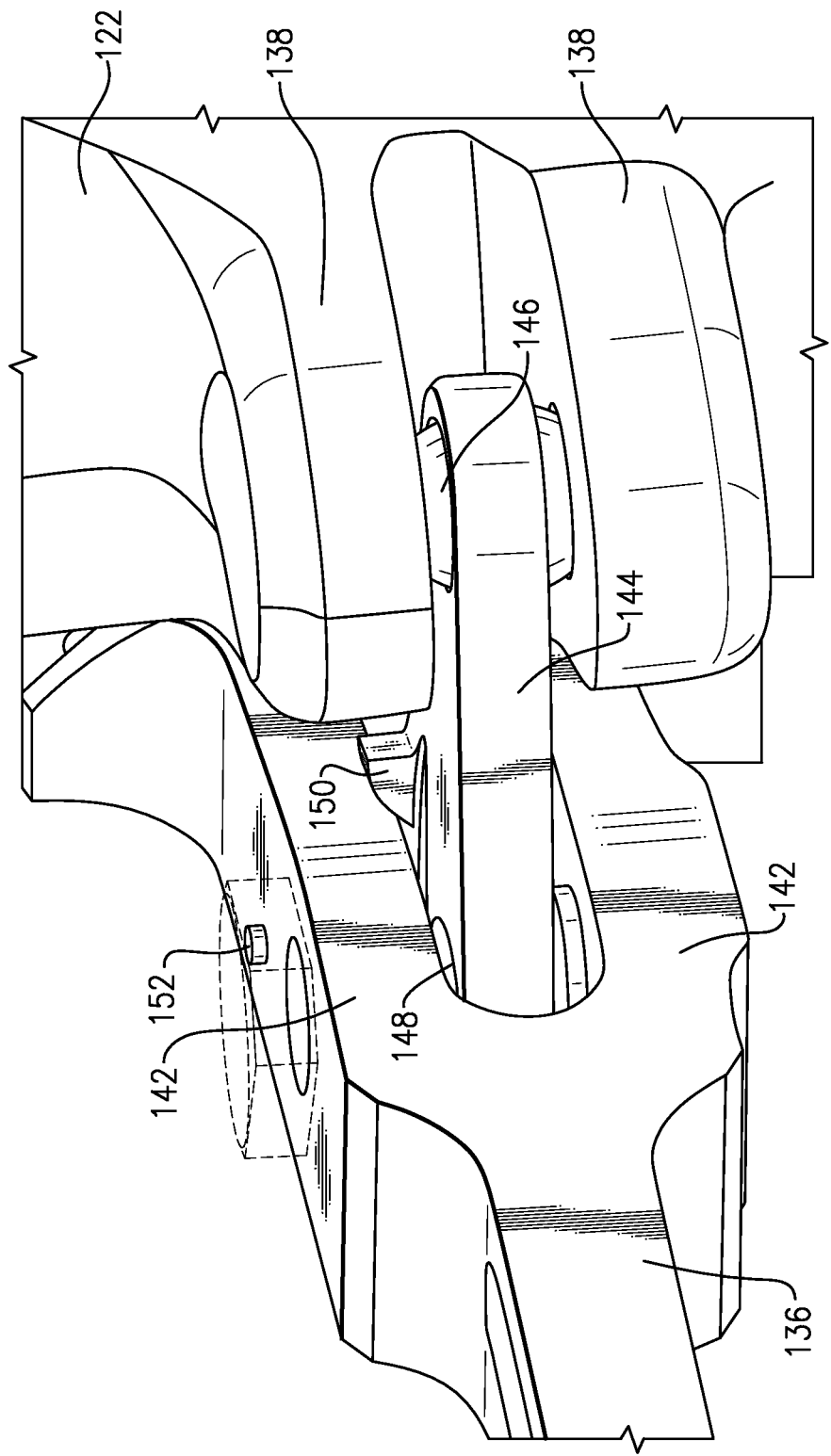
FIG. 3 shows a detail of the mount.

FIG. 3 shows details of the rear mount bracket 136 and link 144. As shown, mount bracket clevis ears 142 receive link 144 connecting the mount bracket 136 to the oil tank clevis ears 138 on the oil tank 122. The link 144 includes spherical bearings 146 and 148 which provide a universal mount within openings in mount bracket clevis ears 142, and the oil tank clevis ears 138. As mentioned above, this type of connection has sometimes resulted in undue wear. Applicant has discovered the undue wear is due to an undesirably large amount of movement.

Thus, a pin 152 is provided to extend between the mount bracket clevis ears 142. Further, a ramp cam 150 is provided on the link 144.

Figure 4:
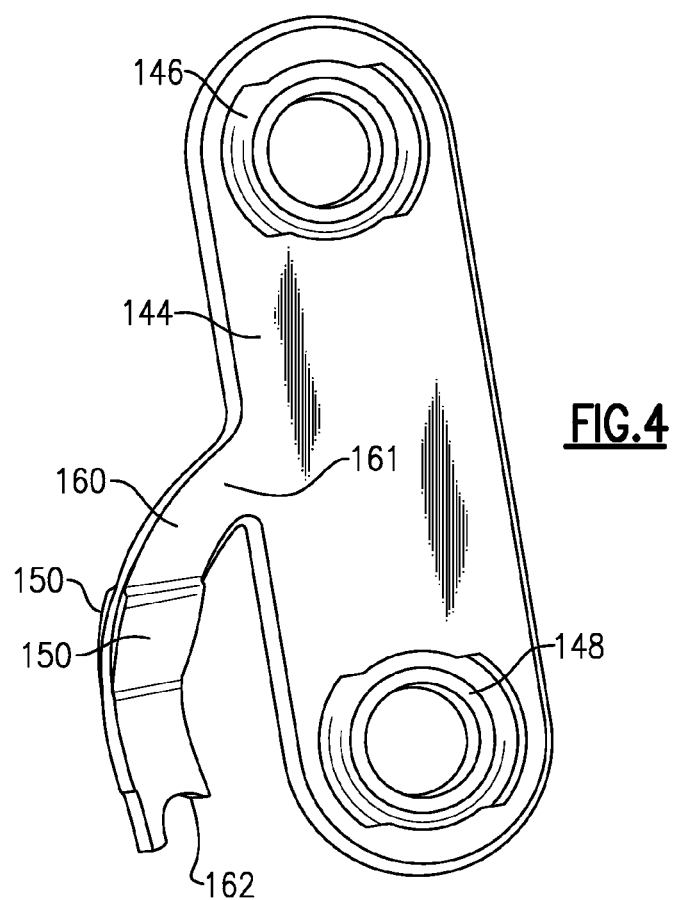
FIG. 4 shows a link.

As shown in FIG. 4, an arm 160 extends to a slot 162, which is spaced further from a point 161 where the arm leaves a body of the link 144, then is the ramp cam 150.

Figure 5:
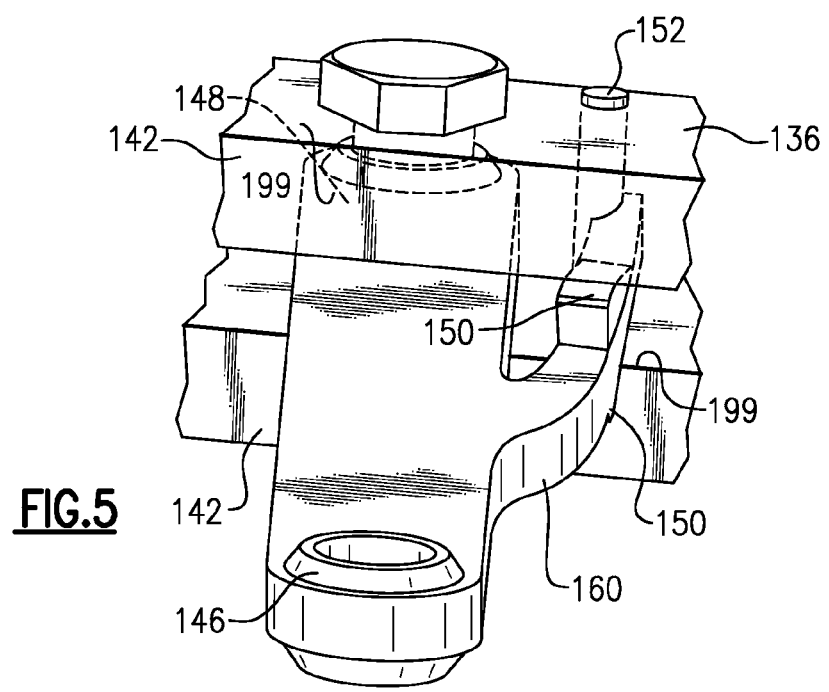
FIG. 5 shows operation of the link.

As shown in FIG. 5, the ramp cam 150 is formed on both sides of the arm 160. The ramp cams 150 extend for a greater distance than a distance between inner surfaces 199 of the two mount bracket clevis ears 142. Further, the pin 152 is shown providing a stop by catching in slot 162. Thus, should the oil tank 122 move relative to the mount bracket 136, and/or the engine wall 120, in a direction such that the ramp cam 150 is forced between the inner surfaces 199 of the mount bracket clevis ears 142, further movement is constrained. In this sense, the ramp cams 150 provide a stop. The pin 152 also provides a stop also preventing any further movement.

Thus, the link 144, as disclosed, will prevent undesired movement of the otherwise universal connection in one direction. It should be understood that under normal operation, the ramp cam 150 would be outward of the space between the mount bracket clevis ears 142, and that it only moves between inner surfaces 199 with undue movement.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An engine comprising:
   an oil tank mounted to an engine wall, with clevis ears formed on both said oil tank and a mount bracket secured to said engine wall, and a link connecting said mount bracket clevis ears to said oil tank clevis ears, said link provided with a pair of spherical bearings providing a connection allowing movement between said link and said oil tank clevis ears, and said link and said mount bracket clevis ears; and
   said link being provided with a stop such that movement of said oil tank relative to said mount bracket in one direction is stopped when said stop is engaged.

2. The engine as set forth in claim 1, wherein said stop includes a pin extending between said mount bracket clevis ears, and an arm extends away from a body of said link, and includes a slot which abuts said pin when undesired movement has occurred.

3. The engine as set forth in claim 2, wherein said stop also includes said arm being provided with a ramp cam extending from at least one surface of said arm, and said ramp cam camming into an inner surface on at least one of said mount bracket clevis ears to stop further movement.

4. The engine as set forth in claim 3, wherein said ramp cam is formed on both of opposed sides of said arm, and said ramp cams abut an inner surface on both of said mount bracket clevis ears at a stop position.

5. The engine as set forth in claim 1, wherein said stop includes said arm being provided with a ramp cam extending from at least one surface of said arm, and said ramp cam camming into an inner surface on at least one of said mount bracket clevis ears to stop further movement.

6. The engine as set forth in claim 5, wherein said ramp cam is formed on both of opposed sides of said arm, and said ramp cams abut an inner surface on both of said mount bracket clevis ears.

* * * * *